United States Patent [19]

Calderon et al.

[11] 4,201,266
[45] May 6, 1980

[54] ROTATABLE WASHER SELF-CLEANING HELICAL SPRING SCREEN AND METHODS

[75] Inventors: Reynaldo Calderon; Billy H. Towell, both of Houston, Tex.

[73] Assignee: Texaco Inc., White Plains, N.Y.

[21] Appl. No.: 957,253

[22] Filed: Nov. 2, 1978

[51] Int. Cl.² .................. E21B 37/02; E21B 43/08
[52] U.S. Cl. .................................. 166/231; 166/104; 166/233; 166/311; 29/163.5 CW
[58] Field of Search ............... 166/231, 232, 233, 311, 166/312, 205, 104; 175/314; 210/106, 108; 29/163.5 CW

[56] References Cited

U.S. PATENT DOCUMENTS

| | | | |
|---|---|---|---|
| 1,638,731 | 8/1927 | Hanson | 166/233 |
| 2,280,054 | 4/1942 | Beck | 166/233 |
| 2,309,697 | 2/1943 | Gunderson | 166/312 UX |
| 2,327,687 | 8/1943 | Williams et al. | 29/163.5 CW |
| 2,729,294 | 1/1956 | Adams | 166/231 |
| 2,744,579 | 5/1956 | Gerhardt | 175/314 X |
| 3,547,194 | 12/1970 | Morine | 166/312 X |
| 3,750,885 | 8/1973 | Fournier | 210/108 X |
| 3,754,651 | 8/1973 | Lannoch | 210/106 |
| 3,901,320 | 8/1975 | Calderon et al. | 166/315 X |
| 3,937,281 | 2/1976 | Harnsberger | 166/233 |

Primary Examiner—Stephen J. Novosad
Attorney, Agent, or Firm—Carl G. Ries; Robert A. Kulason; Theron H. Nichols

[57] ABSTRACT

A method for cleaning a helical spring screen that has become clogged up while filtering liquid deep in a well and while simultaneously producing filtered liquid from the well comprises (1) positioning a cleaning washer with a large opening therein between two coils at one end of the helical spring screen, and (2) rotating the cleaning washer with a rotatable rod of a smaller circumference between all of the coils to the other end of the spring screen for cleaning all foreign material from between the coils of the spring screen, and for simultaneously producing filtered liquid through the cleaning washer large opening while sliding over the rod from one end to the other. A method for forming or assembling a self-cleaning helical screen and two modifications of a new and improved self-cleaning helical spring screen are also disclosed herein. Likewise, a new torque drive mechanism is disclosed between a reversible rotatable square bar means for rotating a washer while providing free longitudinal movement of the square rod in the washer, and for providing free passage of liquid therebetween the bar and the washer.

13 Claims, 9 Drawing Figures

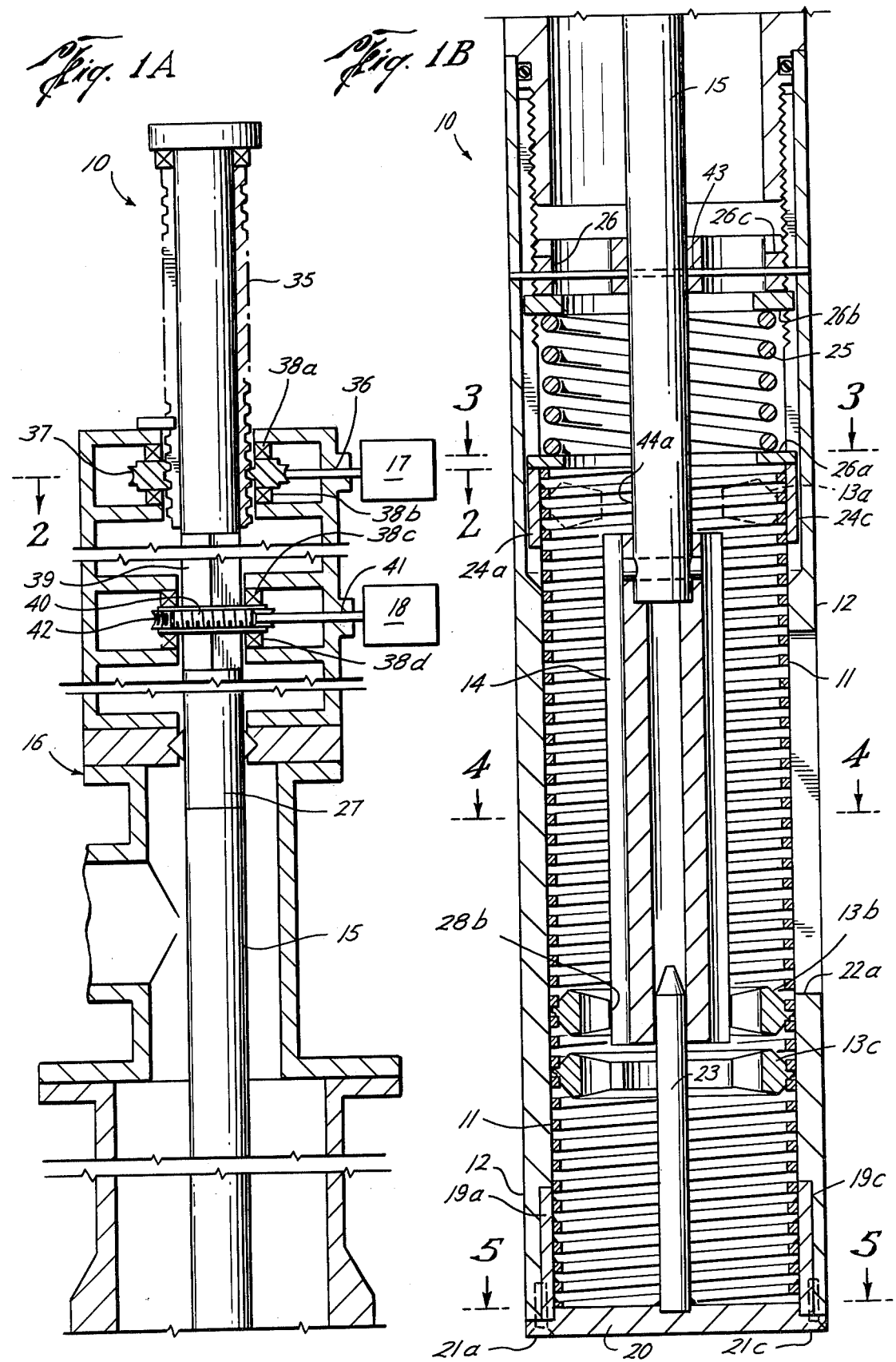

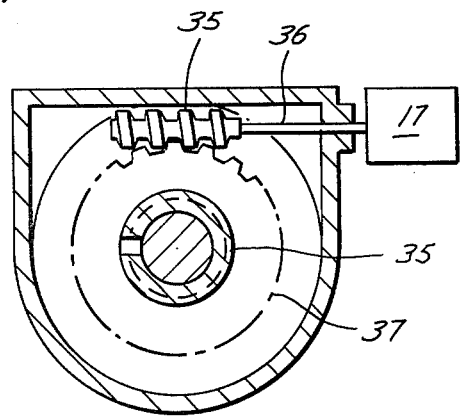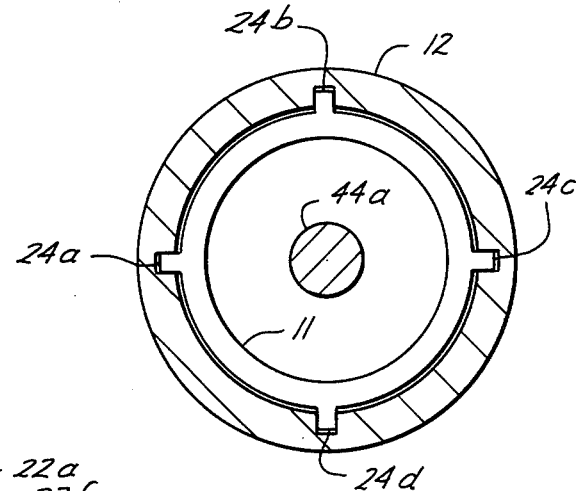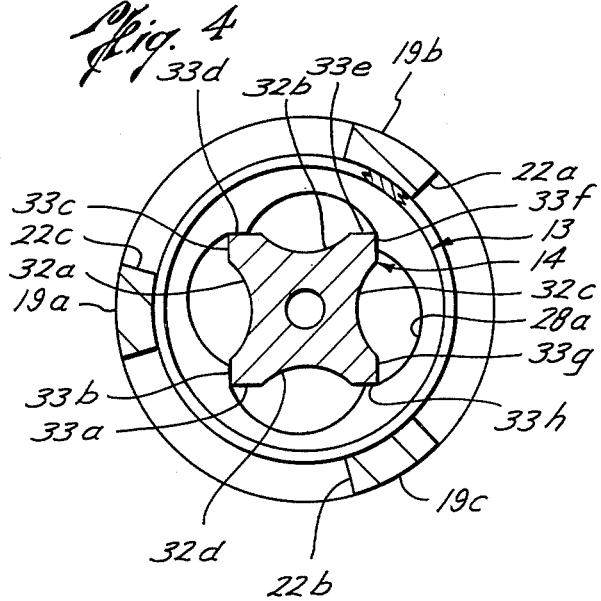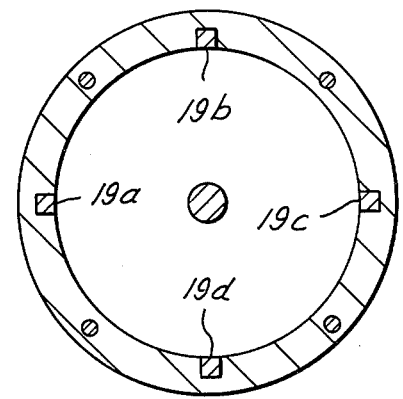

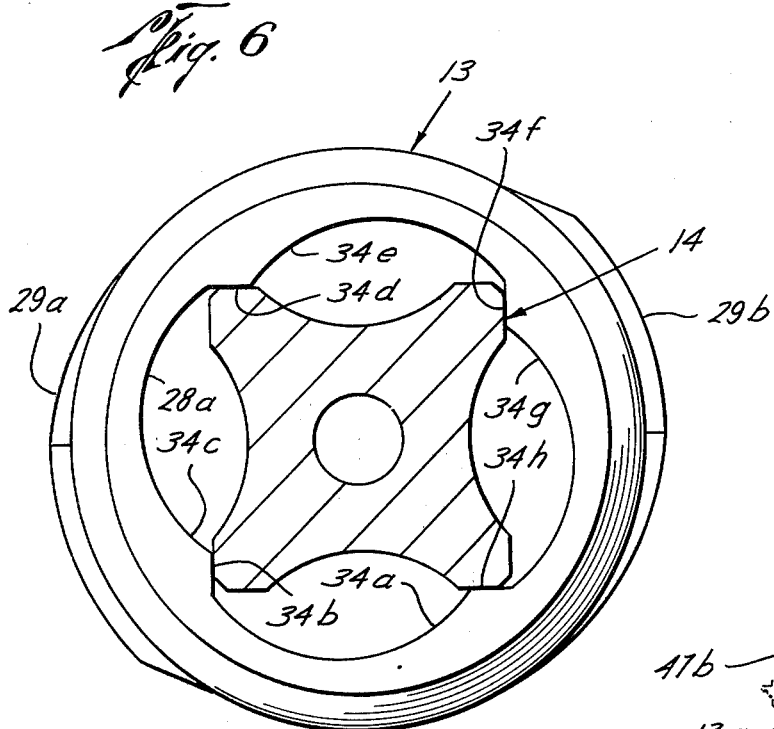
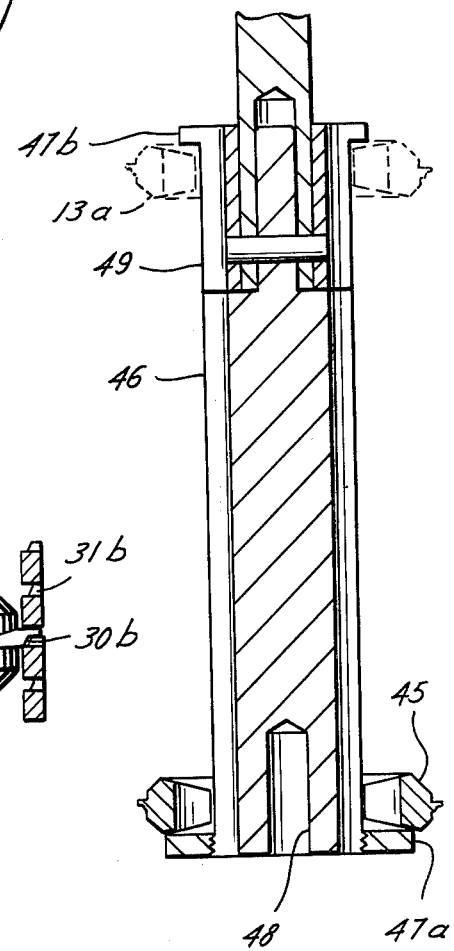
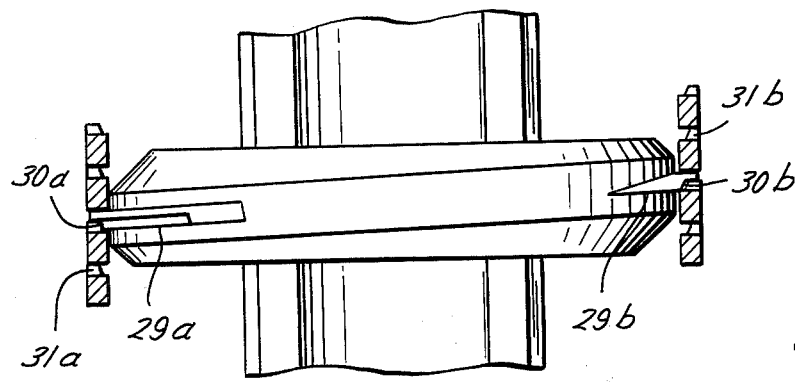

ROTATABLE WASHER SELF-CLEANING HELICAL SPRING SCREEN AND METHODS BACKGROUND OF THE INVENTION

Presently, the basic considerations in the construction of sand screens for oil or water wells are ruggedness of construction, inlet area, resistance to erosion and accuracy of gauge. These considerations are viable as long as the sand screen results in production free from sand. But once production stops due to blockage the sand screen is not functional. Steps must then be taken to alleviate the fluid not passing through the blocked sand screen. The methods presently employed to clean a blocked sand screen are back flushing or pulling the blocked sand screen to the surface, thereby stopping all production of sand-free liquids. Back flushing does not offer a positive means of cleaning because some areas of the sand screen may remain partially blocked thus resulting in a loss of production. Pulling a blocked sand screen is the second method which also results in loss of production due to down time. Thus the purpose of the new rotating washer cleanable sand screen system is to have a system that incorporates the basic considerations in the construction of a sand screen and to have a system that is continually functional through a periodic cleaning. In fact, the new disclosed screen is cleaned by merely rotating a cleaning washer between the coils of the helical spring screen from one end to the other while simultaneously producing filtered liquid through a large opening in the cleaning washer while sliding over a rod from the first end of the screen to its second end. Thus, with a plurality of washers stacked at one end, or the same washer may be passed back and forth any number of times, the screen may be cleaned many times without having to shut the well in for workover, thus saving workover costs and lost production.

There are many thousands of oil wells over the surface of the earth that are drilled and completed in unconsolidated sand, i.e. crumbly sandstone. In such wells, sand does not necessarily precipitate to the bottom of the well, but instead may remain in suspension and may flow up with the oil. As a result, most mechanical parts as valves, bearings, pistons, cylinders, etc. wear out prematurely under such conditions. Accordingly, the sand must be filtered out from the oil, preferably in the well. Petroleum companies have spent large sums of money in trying to find a suitable solution to the sand problem, but heretofore there has been no satisfactory method or long lasting device for preventing the entry of sand into the tube string and eventually into the production tubing and surface tanks.

An oil well foam and wire coil filter is disclosed in U.S. Pat. No. 2,837,032, but that filter is quite sophisticated and expensive to manufacture, and is not adjustable to be opened for backwashing a cleaning liquid, as water, to clean the clogged filter. Another attempted solution was a spring filter as disclosed in U.S. Pat. No. 3,754,651, but because no spacers are apparent between the helical filter elements, the elements would have to be held in slight tension to separate the helical filter elements during filtering. Thus, that filter could not be used as an oil well filter on which high compressive loads may be placed. Likewise, no guide tube or mandrel can be utilized to strengthen the compressive capabilities for converting the filter to one for use in wells. Also, the spring filter of U.S. Pat. No. 3,179,116 is incapable of being strengthened to use in wells. Any compressive force on the triangular spring elements would cause them to collapse, and further the coiled depressions for separating the spring elements would cause the spring elements to flex with a load thereon causing displacement of the adjacent coils and variation of the gauge therebetween.

Accordingly, new and better methods for filtering sand from an oil well, better methods for forming and assembling helical spring sand filters, and better self-cleaning helical spring sand filters are required for mounting on the lower end of a tubing string extending down into a well to the oil containing sand strata.

The disclosed inventions are improvements over those of Assignee's U.S. Pat. Nos. 3,901,320 (166–311) and 3,937,281 (166–233).

OBJECTS OF THE INVENTION

Accordingly, a primary object of this invention is to provide a new and improved method for cleaning a helical spring screen while filtering the liquid.

Another primary object of this invention is to provide a new and improved method for forming or assembling a self-cleaning helical spring screen.

A further primary object of this invention is to provide a new and improved self-cleaning helical spring screen that may be cleaned during filtering operations and without the requirement of transporting the plugged-up screen from the bottom of the well to the surface.

Another object of this invention is to provide a torque drive bar mechanism for rotating a washer therearound for providing free longitudinal movement of said square rod in said washer and free passage of liquid therebetween said bar and said washer.

A still further object of this invention is to provide a method for cleaning a helical spring screen, a method for assembling a self-cleaning screen, a self-cleaning screen for a helical spring screen, and a new reversible torque drive mechanism, both the spring screen and the torque drive mechanism being easy to operate, simple in configuration, economical to build and assemble, and being of greater efficiency for the filtering of sand from oil flowing from the petroliferous formation around the well, and for driving a rod, respectively.

Other objects and various advantages of the disclosed method for cleaning a filter while in the well, method for assembling a helical spring screen, a helical spring screen and a reversible torque drive mechanism will be apparent from the following detailed description, together with the accompanying drawings, submitted for purposes of illustration only and not intended to define the scope of the inventions, reference being made for that purpose to the subjoined claims.

BRIEF DESCRIPTION OF THE DRAWINGS

The drawings diagrammatically illustrate by way of example, not by way of limitation, two forms of the invention wherein like reference numerals designate corresponding parts in the several views in which:

FIGS. 1A and 1B are upper and lower schematic diagrammatic vertical sectional views of the complete rotating washer self-cleaning helical spring screen assembly;

FIG. 2 is a section at 2—2 on FIG. 1A;

FIG. 3 is a section at 3—3 on FIG. 1B;

FIG. 4 is a section at 4—4 on FIG. 1B;

FIG. 5 is a section at 5—5 on FIG. 1B;

FIG. 6 is the front view of a cleaning washer;

FIG. 7 is the side view of the cleaing washer; and

FIG. 8 is a modification of the self-cleaning helical spring screen assembly of FIG. 1B.

The invention disclosed herein, the scope of which being defined in the appended claims is not limited in its application to the details of construction and arrangement of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE INVENTIONS

This patent includes four inventions, a method for cleaning a helical spring screen while filtering liquids deep in a well, a mechanism for practicing the above method comprising a self-cleaning helical spring with one or more cleaning washers inserted between two coils at one end of the helical spring screen, a method for assembling a self-cleaning helical spring screen, and a reversible torque drive square bar for rotating a washer while allowing liquid to pass between the two.

Method for Cleaning a Helical Spring Screen

One aspect of the invention is to be able to clean a helical spring type of screen that has become clogged with a foreign material, as sand, for example, when it is deep in a well without stopping product, and without raising the screen to the surface for cleaning.

Basically, the method for cleaning a helical spring screen or filter (10 FIG. 1B) in a well while simultaneously producing filtered liquid from the well comprises,
 (1) positioning a cleaning washer (13 FIG. 6) with a large opening (28a) therein between two coils at a first end of the helical spring, and
 (2) rotating the cleaning washer with a rotatable rod (14 FIG. 1B) of a smaller diameter than the large opening between all the coils to the other and second end of the helical spring screen for cleaning all foreign material from between the coils of the helical spring screen and for simultaneously producing filtered liquid through the cleaning washer large opening while sliding over the rod from the first end of the helical spring screen to its second end.

A second basic method for cleaning a helical spring screen or filter in a well while simultaneously producing filtered liquid from the well comprises,
 (1) positioning at least one cleaning washer means with a large opening therein between two adjacent coils in a first end of the helical spring sand screen, the large opening in the washer means having a special polygon shape,
 (2) lowering a rotatable rod means having a matching special shape with a smaller circumference for penetrating the cleaning washer means, and
 (3) rotating the cleaning washer means with the rotatable rod means for passing the washer means between all the coils to the second end of the helical spring sand screen for cleaning all foreign material from between the coils of the helical spring sand screen and for simultaneously producing liquid through the cleaning washer large opening while sliding over the rod means.

A more detailed recitation of the above third step may include:
 (3) disconnecting the cleaning washer means from the rotatable rod means at the helical spring screen second end for permitting lowering of the rotatable rod means for picking up another cleaning washer means for the next required screen cleaning and for simultaneously producing filtered liquid through the cleaning washer means large opening while sliding over the rod means from one end to the other.

A different detailed recitation of the above third step may include:
 (3) rotating the cleaning washer means (13a, FIG. 8) with the rotatable rod means between all coils back to the first end of the helical spring screen for the next required screen cleaning with the same cleaning washer means.

Method for Assembling a Self-Cleaning Helical Spring Screen

The self-cleaning helical screen may be formed or assembled in various ways. The preferred method for assembling a self-cleaning helical spring screen that will simultaneously clean itself in a well while producing filtered liquid from the well comprises the following steps:
 (1) fixedly mounting a helical spring screen 11, FIG. 1A in both ends of a perforated screen housing 12,
 (2) inserting a first cleaning washer means 13a with a large opening 28a, FIG. 4 therein between two coils at a first end of the helical spring screen, and
 (3) rotatably mounting a controllable rod means 14 of a substantially smaller circumference than the washer opening on top of the perforated screen housing for movement into the helical spring screen 11, FIG. 1A for connecting with the first cleaning washer means for rotating the cleaning washer means between all the coils to the other and second end of the helical spring screen for cleaning all foreign material from between the coils and for simultaneously producing filtered liquid through the cleaning washer means large opening while sliding over the rod from the first end of the helical spring screen to its second end.

In greater detail the first step above may be expanded into the following three steps:
 (1) fixedly attaching at least one coil of the first end of the helical spring screen to a plurality of guide pins 19a–19d, FIG. 1B for inserting into slots in the first end of the perforated screen housing 12 with the helical spring screen extending internally of the perforated screen housing to a position adjacent to the second end thereof,
 (2) slideably attaching at least one coil of the second end of the helical spring to a plurality of pins 24a–24d for inserting for slideably movement in the second end of the helical spring screen housing, and
 (3) fixedly mounting a compression spring 25 in the second end of the spring housing for maintaining the helical spring screen in compression to ensure that the coils return in place after being spread apart and cleaned by the rotating cleaning washer.

Also, a more detailed third step of the basic method above for assembling a self-cleaning helical spring may be expanded into the following step:

(3) rotatably connecting a rotating mechanism 15 to the controllable rod means 14 for rotating the rod means after it has connected with the first cleaning washer means 13a for rotating the cleaning washer means between all the coils to the second end of the helical spring screen for cleaning all foreign material from between the coils and for simultaneously producing filtered liquid through the cleaning washer means large opening while sliding over the rod from the first end of the helical spring screen to its second end.

A more detailed third method step is as follows:

(3) forming additional cut outs, 32a-32d, FIG. 4 in the rotatable controllable rod means 14 corresponding with the cleaning washer means large opening 28a for ensuring passage of filtered liquid past the cleaning washer for producing filtered liquid to the surface during cleaning of the helical spring screen coils.

A modified method step for the above detailed step 3 is:

(3) forming stops 47a 47b, FIG. 8, on the controllable, rotatable rod means 46 adjacent the two ends of the helical spring screen for maintaining the first cleaning washer means connected to the controllable rod means as it travels from one end of the helical spring screen to the other end for each time cleaning of the coils is required.

The Preferred Embodiment For Practicing The Invention

The above methods for cleaning a helical spring filter or screen in a well while simultaneously producing filtered liquid from the well may be performed by other mechanisms than that disclosed in the FIGURES. The mechanism disclosed herein may be operated by other methods than those disclosed, as by hand. Also the disclosed mechanism can be used to practice another and materially different method. However, the preferred system for performing the method is disclosed in FIGS. 1 to 8.

FIGS. 1A and 1B are each a schematic vertical section of the complete rotating washer self-cleaning helical spring screen assembly 10, FIG. 1A showing the upper portion and FIG. 1B showing the lower portion. This assembly comprising basically a helical spring screen 11, FIG. 1B, an elongated permeable or open screen housing 12, new and special cleaning washers 13a, 13b, and 13c, new and special square rotating rod 14, which is an extension of a rotating mechanism or operating shaft 15 and a polish rod 27, FIG. 1A, in a christmas tree 16 above the ground, a rod lowering mechanism 17, and a rod rotating mechanism 18.

FIG. 1B, an enlarged schematic sectional view of the lower portion of the elongated open screen housing 12, illustrates the coils of the lower end of the helical spring screen 11 welded to four pins 19a, 19b, 19c, and 19d, FIG. 5, insertable into corresponding slots in the internal peripheral surface of the bottom of the housing. While various shapes may be utilized for forming the spring 11, square bar stock is preferred in this case. A bottom face plate or cap 20, FIG. 1B, and four retaining screws 21a, 21b, 21c, and 21d (only screws 21a and 21c being illustrated) retain the four pins and the lower or left end of the helical spring screen fixed in its housing 12.

Slots 22a, 22b, and 22c, FIGS. 2 and 4 are formed in the housing 12 for permitting the sand bearing oil to pass through the housing to reach the helical spring screen for filtering the sand therefrom. However, the housing could be formed with longitudinal or spiral bars if so desired.

A cleaning washer guide 23, FIG. 1B is fixedly secured, as by welding, to the face plate 20 and which face plate is anchored at the desired location, as at the bottom of the well.

A few of the coils of the upper end of the helical spring 11, FIG. 1A, are fixed, as by welding, to four pins 24a-24d, FIGS. 1B and 3, slideable in grooves similar to those at the other end of the helical spring screen. Since the spring screen is formed to a predetermined length, it must be placed in compression to cause all coils to lie against their spacing lugs (not shown) formed on each to space the coils apart by a predetermined distance for filtering the foreign material, as sand. Exemplary coil lugs are shown in Licensee's U.S. Pat. No. 3,937,281, dated Feb. 10, 1976. To accomplish this, a compression spring 25, FIG. 1B, between two keyed compression washers 26a, 26b are positioned against the four slideable pins 24a-24d with a compression nut and operating rod alignment bushing nut 26, FIG. 1B, (ribs thereon not shown) placing all in a predetermined amount of compression for maintaining the helical spring screen in filtering position. Key compression washers 26a and 26b are thus positioned at each end of the spring 25. A spanner wrench may be utilized in slots 26c to adjust nut 26.

The two orthogonal views, FIGS. 6 and 7 illustrate the new cleaning washer 13. This washer comprises a ring with a particularly shaped opening 28a, FIG. 6, therein and with two 180° oppositely positioned helical threaded sectors 29a and 29b thereon the outer periphery of the ring for sliding between the coils for scraping their sides clean as the cleaning washer ring is rotated. The helical threaded sectors 29a and 29b each have notches 30a, 30b, FIG. 7, respectively, therein for passing over the spacing lugs 31a, 31b, on the coil sides as the helical threaded sectors scrape the adjacent sides clean.

FIGS. 4 and 6 illustrate the special opening 28a so that the square rod 14, FIG. 4, with four channels 32a-32d therein, may slide through the cleaning washer 13 and permit uninhibited flow of filtered liquid up through the openings 28a in the cleaning washer and channels 32, FIG. 4, in the rod to arrive at the surface. With the four channels 32a, 32b, 32c, and 32d formed in the four surfaces of the square cross-sectioned rod 14, two bearing surfaces are formed on each corner of the rod, the bearing surfaces being identified as 33a, 33b, 33c, 33d, 33e, 33f, 33g, and 33h, FIG. 4. Likewise, the opening 28, FIG. 6, in the cleaning washer 13 has four corners therein, each corner having two corresponding bearing surfaces, these cleaning washer bearing surfaces being identified as 34a, 34b, 34c, 34d, 34e, 34f, 34g, and 34h, and which match up to contact the respective rod bearing surfaces 33a, 33b, 33c, 33d, 33f, and 33h. Only alternate bearing surfaces are contacted when the rod is turning the cleaning washer in one direction and the other alternate bearing surfaces are contacted when rotating the cleaning washer in the other direction.

The square rod 14, FIG. 1B, has an undercut area 44a around it at the top of the screen for storing the washers after each has made its cleaning trip to the top, only room for one being shown. The operating shaft is lowered to engage the next cleaning washer, thus disengaging the top washer and allowing the operating shaft to rotate freely in the top washer and providing more area for produced fluids to flow. While an undercut area may likewise be formed on the lower end of the rod, the guide or alignment shaft 23 instead is utilized here so that the rod washer will only engage the first washer.

FIG. 1A shows more details of the rod lowering control mechanism 17 which comprises a worm gear positioned behind shaft 35, FIG. 1A, and rotated by a shaft 36 rotated by any suitable conventional controllable power source (not shown). A worm wheel 37 driven by the worm gear shaft 36 is mounted in thrust bearing 38a, FIG. 1A and 38b for raising and lowering a threaded round shaft 35 connected to the square rod 39 on the polish rod section of the operating shaft 15 connected to lower rotatable rod 14. Thus, rotation of lowering mechanism worm gear shaft 36 by lowering control mechanism 17, FIG. 1A, lowers or raises the square rod 39 and square rod 14 for picking up another cleaning washer or ring.

A rod rotating control mechanism is illustrated in FIG. 1A comprising another worm gear 40 rotated by a shaft 41 which is rotated by a suitable conventional control mechanism 18. A worm wheel 42, driven by the worm, ear 40 is mounted in thrust bearings 38c, FIG. 1A, and 38d for rotating the square shaft 39 which is slideable vertically therein. Thus the polish rod, operating shaft and rod 14 are rotated as desired for rotating the cleaning washers successively.

Briefly, in operation, with a stack of cleaning washers 13 positioned between the coils of the helical spring screen in the bottom of the screen housing and with the rod 14 inserted only into the top cleaning washer 13a, then a shear pin 43, illustrated in the upper portion of FIG. 1B is inserted through the housing 12 and rod 14 for holding all parts in position until lowered into the well and the housing secured to the side walls or a packer in the well for filtering sand or any other foreign material from the liquid, as oil in the well. Then when the helical spring screen has become clogged and requires its first cleaning, the rod rotating mechanism 18 is activated and the rod rotated in a predetermined direction for a predetermined number of revolutions until the cleaning washer 13a with its helical threaded sectors 29 scrapes between all the coils to the top of the helical spring screen 11 where the cleaning washer becomes disconnected from the square rod in the storage or undercut area 44 of the rod after cleaning the full length of the helical spring screen. Then after the screen gets clogged again, the rod 14 is lowered further into the next cleaning washer 13b with its similar special connecting opening 28b. The rod is then rotated until the second cleaning washer 13b has scraped between the coils from the bottom to the top for cleaning all foreign material from between the coils of the helical spring screen a second time. This process may be repeated for cleaning the screen as many time as there are cleaning washers 13 in the bottom of the helical spring screen.

A modification comprises a single cleaning washer 45, FIG. 8, similar to the others, but slideable on a reversible square rotating rod 46 having cleaning washer lower and upper stops 47a and 47b. Lower cleaning washer stop 47a is removably secured to the bottom of the square rotating rod 46 as by screw threads formed thereon. A bearing surface 48, FIG. 8, is formed on the bottom of square rotating rod 46 for resting on and fitting over guide 23, FIG. 1B. Square rotating rod 46, FIG. 8, has its upper undercut area 49 spaced beyond the helical spring screen 11, FIG. 1B, and keyed compression washer 26a into the area of the compression spring 25 for preventing the single washer ring 45, FIG. 8, from becoming disengaged from the square rod 46 as it slides back and forth between stops 47a and 47b.

Thus, in operation of the modification of FIG. 8, when screen cleaning is required, the reversible square rotating rod 46 with the cleaning washer at the bottom is rotated for a predetermined number of revolutions until the cleaning washer has traversed the length of the helical spring screen to the other and upper cleaning washer stop 47b where it is stopped. Then the direction of rotation is reversed to return the cleaning washer to the bottom position. For the next and second cleaning of the clogged screen, the reversible square rotating rod 46 is rotated in the first direction for traversing the cleaning washer 45 back up the rod 46 to the upper cleaning washer stop 47b and then back down for cleaning between all coils of the helical srping screen again. This process or round trip is repeated as often as desired for each screen cleaning.

Torque Drive Mechanism

FIGS. 4 and 6 illustrate the longitudinal bar 14 for applying torque to each round disk or washer shaped means 13, which requires free longitudinal movement of the square rod in the washer and free passage of liquid therebetween the square bar and the washer, such as but not limited to, for driving a cleaning washer meachanism in a helical spring screen.

Briefly, in operation, with a stack of cleaning washers 13 positioned between the coils of the helical spring screen in the bottom of the screen housing and with the rod 14 inserted only into the top cleaning washer 13a, then a shear pin 43, illustrated in the upper portion of FIG. 1B is inserted through the housing 12 and rod 14 for holding all parts in position until lowered into the well and the housing secured to the side walls or a packer in the well for filtering sand or any other foreign material from the liquid, as oil in the well. Then when the helical spring screen has become clogged and requires its first cleaning, the rod rotating mechanism 18 is activated and the rod rotated in a predetermined direction for a predetermined number of revolutions until the cleaning washer 13a with its helical threaded sectors 29 scrapes between all the coils to the top of the helical spring screen 11 where the cleaning washer becomes disconnected from the square rod in the storage or undercut area 44 of the rod after cleaning the full length of the helical spring screen. Then after the screen gets clogged again, the rod 14 is lowered further into the next cleaning washer 13b with its similar special connecting opening 28b. The rod is then rotated until the second cleaning washer 13b has scraped between the coils from the bottom to the top for cleaning all foreign material from between the coils of the helical spring screen a second time. This process may be repeated for cleaning the screen as many times as there are cleaning washers 13 in the bottom of the helical spring screen.

Thus, a few methods, a torque drive mechanism, and a helical spring screen cleaning mechanism are disclosed for cleaning the screen a multiplicity of times without having to shut the well in for workover, thus saving workover costs and lost production.

Obviously, other methods may be utilized for cleaning a helical spring screen with the embodiments of either FIG. 1 or FIG. 8 than those listed above, depending on the particular information desired to be transmitted.

Accordingly, it will be seen that the above disclosed method for cleaning a helical spring screen, a method for assembling a helical spring screen, the two modifications of a helical spring screen, and a torque drive mechanism will operate in a manner which meets each of the objects set forth hereinbefore.

While only two methods of the invention and two mechanisms for carrying out the methods have been disclosed, it will be evident that various other methods and modifications are possible in the arrangement and construction of the disclosed methods, helical spring screens, and torque drive mechanisms without departing from the scope of the invention and it is accordingly desired to comprehend within the purview of this invention such modifications as may be considered to fall within the scope of the appended claims.

We claim:

1. A method for assembling a self-cleaning helical spring screen that will simultaneously clean itself of foreign material between the coils of the helical spring screen in a well while producing filtered liquid from the well comprising the steps of,
    (a) fixedly mounting a helical spring screen between both ends of a perforated screen housing,
    (b) inserting a first cleaning washer means with a large opening therein between two coils at a first end of the helical spring screen, and
    (c) rotatably mounting a controllable rod means of a substantially smaller circumference than the washer opening on top of the perforated screen housing for movement into the helical spring screen for connecting with the first cleaning washer means for rotating the cleaning washer means between the coils to a second end of the helical spring screen for cleaning the foreign material from between the coils and for simultaneously producing filtered liquid through the cleaning washer means large opening while sliding over the rod from the first end of the helical spring screen to its second end.

2. A method as recited in claim 1 wherein the first step comprises further,
    (a) fixedly attaching at least one coil of the first end of the helical spring screen to a plurality of pins for inserting into slots in the first end of the perforated screen housing with the helical spring screen extending internally of the perforated screen housing to a position adjacent to the second end thereof.
    (b) slideably attaching at least one coil of the second end of the helical spring to a plurality of pins for inserting for slideable movement in the second end of the helical spring screen housing, and
    (c) fixedly mounting a compression spring in the second end of the spring housing for maintaining the helical spring screen in compression to ensure that the coils return in place after being spread apart and cleaned by the rotating cleaning washer.

3. A method as recited in claim 1 wherein the third step includes further,
    (a) rotatably connecting a lowering mechanism to the controllable rod means for lowering the rod means for connecting with the second cleaning washer means and simultaneously disconnecting from the first cleaning washer means.

4. A method as recited in claim 1 wherein the third step includes further,
    (a) rotatably connecting a rotating mechanism to the controllable rod means for rotating the rod means after it has connected with the first cleaning washer means for rotating the cleaning washer means between all the coils to the second end of the helical spring screen for cleaning the foreign material from between the coils and for simultaneously producing filtered liquid through the cleaning washer means large opening while sliding over the rod from the first end of the helical spring screen to its second end.

5. A method as recited in claim 1 wherein the third step includes further,
    (a) forming additional cut-outs in the rotatable controllable rod means corresponding with the cleaning washer means large opening for ensuring passage of filtered liquid through the cleaning washer for producing filtered liquid to the surface during cleaning of the helical spring screen coils.

6. A method as recited in claim 1 wherein the third step includes further,
    (a) forming stops on the controllable rod means adjacent the two ends of the helical spring screen for maintaining the first cleaning washer means connected to the controllable rod means as it travels from one end of the helical spring screen to the other end for each time cleaning of the coils is required.

7. A self-cleaning helical spring screen for being cleaned of foreign material from between the coils of the spring screen in a well while simultaneously producing filtered liquid from the well comprising,
    (a) helical spring screen means secured at its first and second ends in an elongated open screen housing,
    (b) cleaning washer means having a large opening therein rotatably mounted between two coils at said first end of the helical spring screen means,
    (c) controllable rod means having a substantially smaller circumference than said washer opening for moving into said helical spring screen means,
    (d) said controllable rod means being responsive to a rod extendible means for being extended into said helical spring screen means for engaging said cleaning washer means, and
    (e) said controllable rod means being responsive to a rod rotating means for rotating said cleaning washer means between the coils from said first end to said second end of said helical spring screen means for cleaning the foreign material from between the coils and for simultaneously producing filtered liquid through said cleaning washer means large opening while sliding over the rod means from said first end of said helical spring screen means to its second end.

8. A self-cleaning helical spring screen as recited in claim 7 wherein said means for securing said helical spring screen means to said elongated perforated screen housing comprises,
    (a) first pin means for fixing at least one coil of said first end or said helical spring screen means to a first end at said elongated perforated screen housing,
    (b) second pin means for slideably connecting at least one coil of said second end of said helical spring screen means to a second end of said elongated perforated screen housing, and (c) compression spring means secured between said second end of said elongated perforated screen housing and said second end of said helical spring screen means for placing the helical spring screen in compression to ensure that the coils return in place after being spread apart and cleaned by the rotating cleaning washer means.

9. A self-cleaning helical spring screen as recited in claim 7 wherein, (a) said controllable rod means has a special shaped end, (b) said cleaning washer means has a corresponding special shaped large opening for receiving said rotatable controllable rod means special shaped end for being rotated thereby, and (c) said cleaning washer means has at least two opposite lugs on the outer periphery thereof for sliding between the contiguous coils for cleaning the foreign material from between the coils and for simultaneously producing filtered liquid through said cleaning washer means large opening while sliding over said rod means from said first end of said helical spring screen to its second end.

10. A self-cleaning helical spring screen as recited in claim 7 wherein, (a) said controllable rod means has a plurality of flat surfaces, and (b) said large opening in said cleaning washer means comprising arcuate cut-outs opposite each of said controllable rod means flat surfaces for ensuring passage of filtered liquid through the cleaning washer means for passing produced filtered liquid to the surface during the cleaning of the helical spring screen coils.

11. A self-cleaning helical spring screen as recited in claim 10 wherein, (a) each of said controllable rod means flat sides having a cut-out therein corresponding to the cleaning washer means arcuate cut outs for ensuring passage of filtered liquid through the cleaning washer means for produced filtered liquid to the surface during the cleaning passing of the helical spring screen coils.

12. A self-cleaning helical spring screen as recited in claim 7 wherein, (a) said controllable rod means has an undercut thereon at the two locations adjacent said two ends of the helical spring screen means for disconnecting said cleaning washer means for preventing its rotation with said rotating controllable rod after said cleaning washer means has completed the trip from said first end to said second end of said helical spring screen means and for returning said controllable rod means to said first end of the helical spring screen means for connecting to the next cleaning washer means for the next required screen cleaning.

13. A self-cleaning helical spring screen as recited in claim 7 wherein, (a) said controllable rod means has stop means at the two locations adjacent said two ends of said helical spring screen means for preventing said cleaning washer means from becoming disconnected from said controllable rod means after completing the trip from said first end to said second end of said helical spring screen means so that it may take the return trip for the next required screen cleaning.

* * * * *